(12) United States Patent
Borkar et al.

(10) Patent No.: US 7,412,353 B2
(45) Date of Patent: Aug. 12, 2008

(54) RELIABLE COMPUTING WITH A MANY-CORE PROCESSOR

(75) Inventors: Shekhar Borkar, Beaverton, OR (US); Yatin Hoskote, Portland, OR (US); Shu-Ling Garver, Scappoose, OR (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 11/238,488

(22) Filed: Sep. 28, 2005

(65) Prior Publication Data

US 2007/0074011 A1      Mar. 29, 2007

(51) Int. Cl.
*G06F 15/00* (2006.01)

(52) U.S. Cl. .................. 702/186; 713/100; 712/227

(58) Field of Classification Search .......... 702/183, 702/186, 187, 123, 119, 60; 717/140, 148; 719/131, 152; 713/100; 712/227; 714/39
See application file for complete search history.

(56) References Cited

U.S. PATENT DOCUMENTS

| 7,082,600 B1 * | 7/2006 | Rau et al. ............. 717/148 |
| 2002/0065049 A1 | 5/2002 | Chauvel et al. |
| 2003/0005380 A1 | 1/2003 | Nguyen et al. |
| 2003/0110012 A1 | 6/2003 | Orenstien et al. |
| 2004/0123201 A1 | 6/2004 | Nguyen et al. |
| 2004/0128563 A1 | 7/2004 | Kaushik et al. |
| 2004/0215987 A1 | 10/2004 | Farkas et al. |
| 2005/0283679 A1 * | 12/2005 | Heller et al. ............. 714/39 |

OTHER PUBLICATIONS

International Search Report and Written Opinion for corresponding matter P22401PCT dated Oct. 16, 2007.
Borkar et al., "Platform 2015: Intel Processor and Platform Evolution for the Next Decade", Technology @ Intel Magazine, Mar. 2005, pp. 1-10.

(Continued)

*Primary Examiner*—Bryan Bui
(74) *Attorney, Agent, or Firm*—Guojun Zhou (57) ABSTRACT

According to embodiments of the disclosed subject matter, cores in a many-core processor may be periodically tested to obtain and/or refresh their dynamic profiles. The dynamic profile of a core may include information on its maximum operating frequency, power consumption, power leakage, functional correctness, and other parameters, as well as the trending information of these parameters. Once a dynamic profile has been created for each core, cores in a many-core processor may be grouped into different bins according to their characteristics. Based on dynamic profiles and the grouping information, the operating system ("OS") or other software may allocate a task to those cores that are most suitable for the task. The interconnect fabric in the many-core processor may be reconfigured to ensure a high level of connectivity among the selected cores. Additionally, cores may be re-allocated and/or re-balanced to a task in response to changes in the environment.

22 Claims, 11 Drawing Sheets

OTHER PUBLICATIONS

Kumar et al., "Single-ISA Heterogeneous Multi-Core Architectures for Multithreaded Workload Performance", Proceedings of the 31st Annual International Symposium on Computer Architecture, Munich, Germany, Jun. 19-23, 2004, pp. 64-75.

Chapin et al., "Hive: Fault Containment for Shared-Memory Multiprocessors", Operating Systems Review, ACM, vol. 29, No. 5, Dec. 1995, pp. 12-25.

Gentzsch et al., "Self-Adaptable Autonomic Computing Systems: An Industry View", Proceedings on the 16th International Workshop on Database and Expert Systems Applications, Copenhagen, Denmark, Aug. 22-26, 2006, pp. 201-205.

Benini et al., "Networks on Chips: A New SoC Paradigm", Computer IEEE Service Center, vol. 35, No. 78, pp. 70-78, no dated.

Shivakumar et al., "Exploiting Microarchitectural Redundancy for Defect Tolerance", Proceeding of the 21st International Conference on Computer Design: VSLI in Computers and Processors, Los Alamitos, California, Oct. 13-15, 2003, pp. 481-488.

Chae-Eun Rhee et al., "Many-to-Many Core-Switch Mapping in 2-D Mesh NoC Architectures", Computer Design: VSLI in Computers and Processors, 2004, ICCD 2004, Proceedings, IEEE International Conference, Oct. 11-13, 2004, pp. 438-443.

* cited by examiner

RELIABLE COMPUTING WITH A MANY-CORE PROCESSOR

BACKGROUND

1. Field

This disclosure relates generally to microprocessors and, more specifically, to processors that have many cores.

2. Description

A many-core processor has multiple processing cores on the same die. As process technology scales to a very small dimension, the currently prevailing design approach of achieving high performance by increasing processor frequency is severely limited by drastically increased power consumption. One alternative design approach to achieve high performance is to distribute an application across many "small" cores that are running concurrently at slower speed than a typical "larger" core. Because each "small" core is simpler, smaller and far less power hungry than a "large" core while still delivering significant performance, this many-core based design approach can help manage the power consumption more efficiently than a large-core based design approach.

Although a many-core processor has advantages over a processor with a single core or a few large cores, it also faces many challenges as the process technology scales down to small dimensions. For example, process variations, either static or dynamic, may make transistors unreliable; transient error rates may be high since capacitance on storage nodes is small and voltages are low; and reliability over time may deteriorate as transistor degradation may become worse as time passes. Such challenges may result in situations where cores in a many-core processor that perform well during factory testing fail to perform as well as before or stop performing completely over time. This makes one time factory testing and burn-in, as applied for traditional processors, less effective to ensure reliable computing with a many-core processor over time. Therefore, it is desirable to have the ability to periodically test the performance of cores in a many-core processor during its lifetime and use the test data thus obtained to improve its performance for applications.

BRIEF DESCRIPTION OF THE DRAWINGS

The features and advantages of the disclosed subject matter will become apparent from the following detailed description of the subject matter in which.

DETAILED DESCRIPTION

According to embodiments of the disclosed subject matter in this application, cores in a many-core processor may be periodically tested to obtain and/or refresh their dynamic profiles. The dynamic profile of a core may include information on its maximum operating frequency, power consumption, power leakage, functional correctness, and other parameters. The dynamic profile may also include the trending information of these parameters, which indicates the reliability of the core over time. These parameters may be obtained by modules embedded in the many-core processor such as an operating speed measuring module, a power consumption measuring module, temperature sensors, and a functional correctness checking module. The information relating to the functional correctness of each core may be obtained by using a coarse grain functional redundancy checking ("FRC") scheme and/or a fine grain FRC scheme. The dynamic profile for each core may be stored in the core's own memory or in memory shared by some or all of the cores. When a dynamic profile is first obtained, it does not include the trending information; but from the second periodic test on, the trending information may be obtained and updated after a later test.

Once a dynamic profile has been created for each core, cores in a many-core processor may be grouped into different bins according to their characteristics. For example, cores with high maximum operating frequency may be labeled as fast cores; cores with low power consumption may be labeled as low power consumption cores; cores with good trending information may be labeled as reliable cores; etc. Based on dynamic profiles and the grouping information, the operating system ("OS") or an intermediate software layer may allocate a task to those cores that are most suitable for the task. For example, if the task requires intensive computation, the task may be assigned to fast cores. Once certain cores are selected for the task, the interconnect fabric in the many-core processor may be re-configured to ensure a high level of connectivity among the selected cores so that an at least acceptable bandwidth and latency across the selected cores may be achieved. Additionally, the OS may re-allocate cores to a task in response to changes in the environment and the interconnect fabric may be re-configured accordingly.

Reference in the specification to "one embodiment" or "an embodiments" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
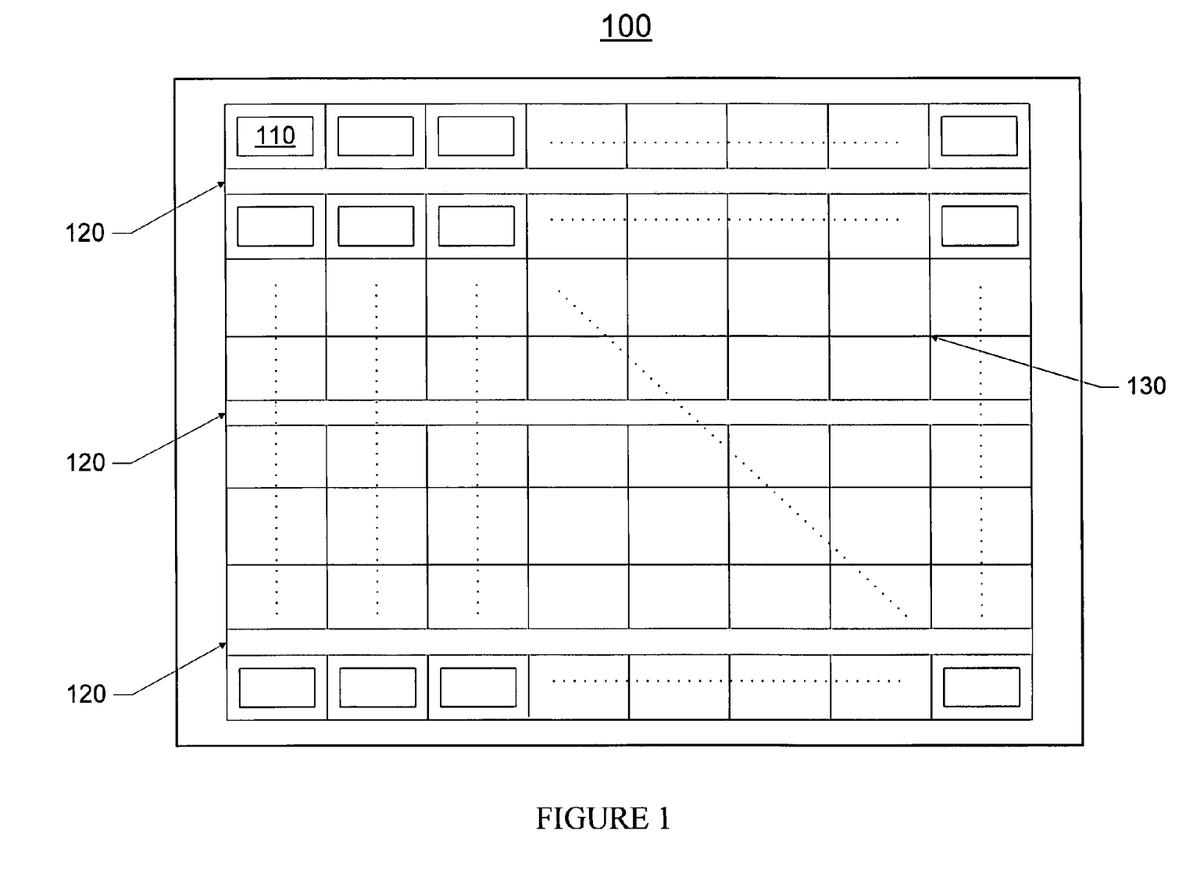
FIG. 1 illustrates an example many-core processor.

FIG. 1 illustrates the structure of an example many-core processor 100. Processor 100 comprises an 8-by-8 array of cores (e.g., core 110) sitting on a two-dimensional (2D) interconnect fabric 130. Each core may have its local memory (not shown in the figure). There are also shared memories (e.g., 120) attached to the interconnect fabric 130. Compared to processors that have a single core or only a few cores, the number of cores in a many-core processor is large. As a result, the size of each core in a many-core processor is small compared to those cores in a single-core or few-core processor. Although FIG. 1 shows an example processor 100 which has only 64 cores, the number of cores in a many-core processor can vary and may be much larger than 64 (e.g., 256, 512, 1024). Processor 100 also comprises input/output (I/O) interconnects (not shown in the figure) to connect each core with peripheral devices (e.g., graphic devices). In one embodiment, I/O interconnects may surround all of the cores in the processor die. In another embodiment, I/O interconnects may be embedded among the cores.

Typically, a processor is tested after it is packaged to ensure that it is working properly. For a many-core processor in future, however, such one time factory testing may not be sufficient to ensure its quality as the process technology scales down (e.g., at 35 nanometer (nm) or even finer process technology). For example, the maximum operating frequency of a core may decrease due to aging. Thus, it is desirable to periodically test cores inside a many-core processor and to adapt an application running on the processor according to the test data. Data from periodic tests may be used to create a profile for each core. The profile is dynamic because it may be updated/refreshed after each test. The dynamic profile of each core may include information on the core's maximum frequency, power consumption, power leakage, functional correctness, and other parameters. The dynamic profile may also include the trending information of these parameters.

Figure 2:
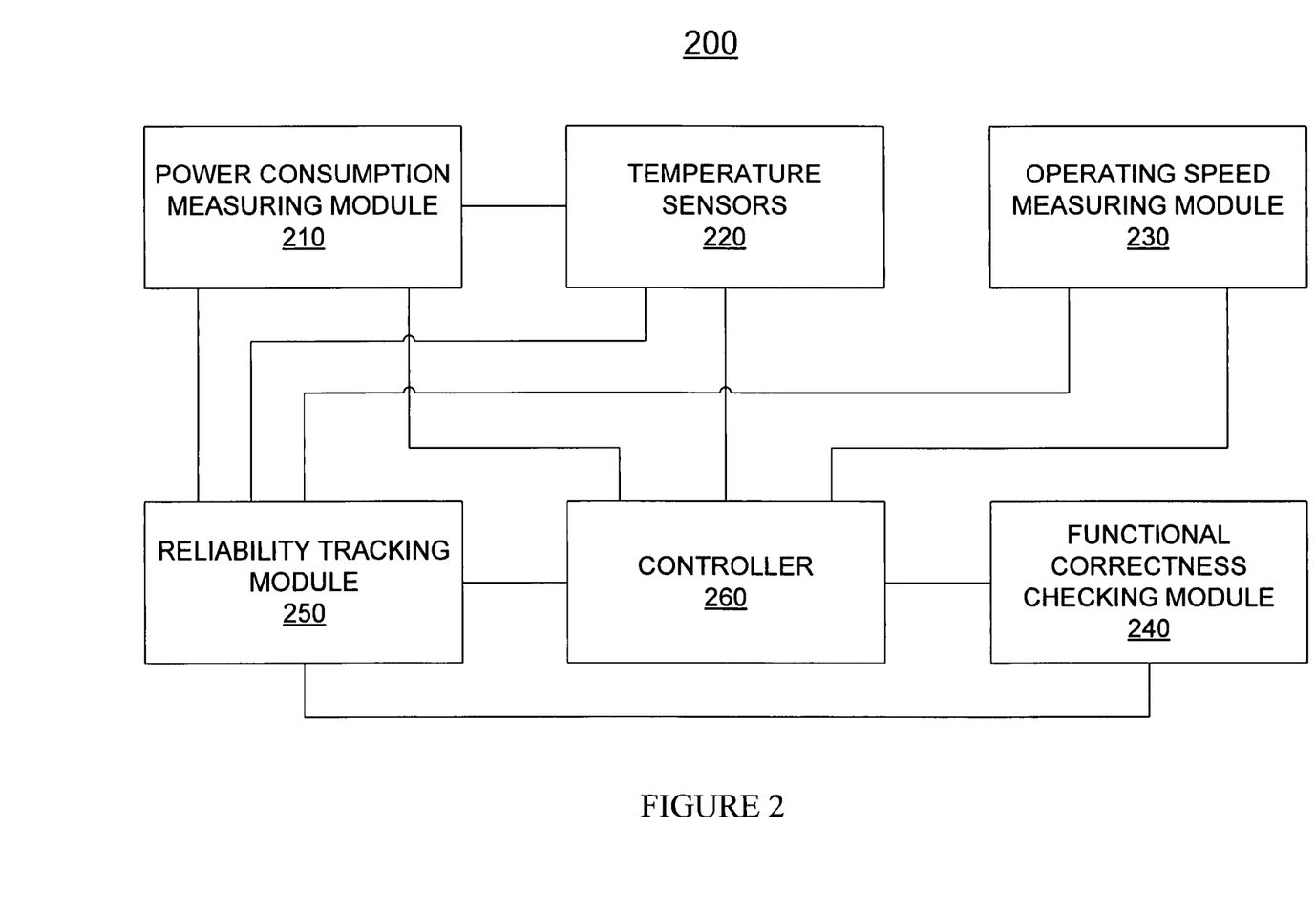
FIG. 2 shows one example block diagram of a dynamic profiling apparatus that periodically performs dynamic profiling for each core in a many-core processor.

FIG. 2 shows one example block diagram of a dynamic profiling apparatus 200 that periodically performs dynamic profiling for each core in a many-core processor. Apparatus 200 comprises a power consumption measuring module 210, temperature sensors 220, an operating speed measuring module 230, a functional correctness checking module 240, a reliability tracking module 250, and a controller 260. Note that a dynamic profiling apparatus may include other components used to measure other parameters of a core in addition to those shown in FIG. 2. Components in a dynamic profiling apparatus may be implemented in firmware and/or hardware and stored in a many-core processor.

Power consumption measuring module 210 may measure power consumption of a core by running a power virus or other power hungry applications. The power consumption measuring module may also measure a core's power consumption by measuring the current drain by the core, voltage drop, or even the temperature of the core. In one embodiment, a many-core processor may have one power consumption measuring module to measure power consumption of each core sequentially or in parallel during each test. In another embodiment, each core may have a power consumption measuring module or several cores share one power consumption measuring module. Temperature sensors 220 may work with the power consumption measuring module to measure temperature increase resulted from power consumption by each core and/or to measure power leakage of each core in a many-core processor. Power leakage of a core may be measured through the leakage current of the core. The leakage current may be used in combination with the temperature and voltage drop of a core to obtain power leakage and trending information of the core. Temperature sensors 220 may also be used to determine temperature variation across the die of a many-core processor and to identify hot spots in the die. The information so obtained may indicate which cores are generating more heat than others so that the OS may allocate cores to tasks accordingly to avoid concentrating on those cores that tend to generate more heat.

Operating speed measuring module 230 may measure the maximum operating frequency of a core by dynamically varying the voltage supply and phase lock loop (PLL) clock frequency of the core. Typically, voltage increase helps increase the operating frequency of a core. The maximum operating frequency of a core may be obtained under the upper limit of the voltage that can be supplied to the core by stepping up the PLL clock frequency until the PLL clock frequency cannot be further increased. The dynamic profile of a core may maintain a set of operating frequencies, each being the maximum operating frequency under a certain voltage value. The operating frequency measuring module may coordinate with the power consumption measuring module and the temperature sensors to measure the power consumption and leakage and the maximum operating frequencies of a core cooperatively.

Functional correctness checking module 240 may dynamically detect any errors or faults by using core level functional checking schemes. When such a scheme is used, a second core, the "checker" executes in lock-step with the "master" core. The checker samples the master's outputs, compares those values with the values it computes internally, and asserts an error signal if a mismatch occurs. The checker may be doing other operations as well. Thus it is not just a redundant core such as in FRC schemes, but is doing other useful work at the same time. A third core may be used to re-run the computation when results from the checker mismatch the results from the master. If results from the third core match the results from either the checker or the master, the core between the checker and the master whose results mismatch the results from of the third core may be identified as the one causing errors. In case results from the third core do not match with results from either the checker or the master, the third core itself may be faulty and a fourth core may be needed to re-run the computation. This process may continue until results from an additional core that re-runs the computation match the results from either the checker or the master. Faulty or slow processors are flagged to be placed in specific faulty bins for appropriate task allocation.

Figure 3A:
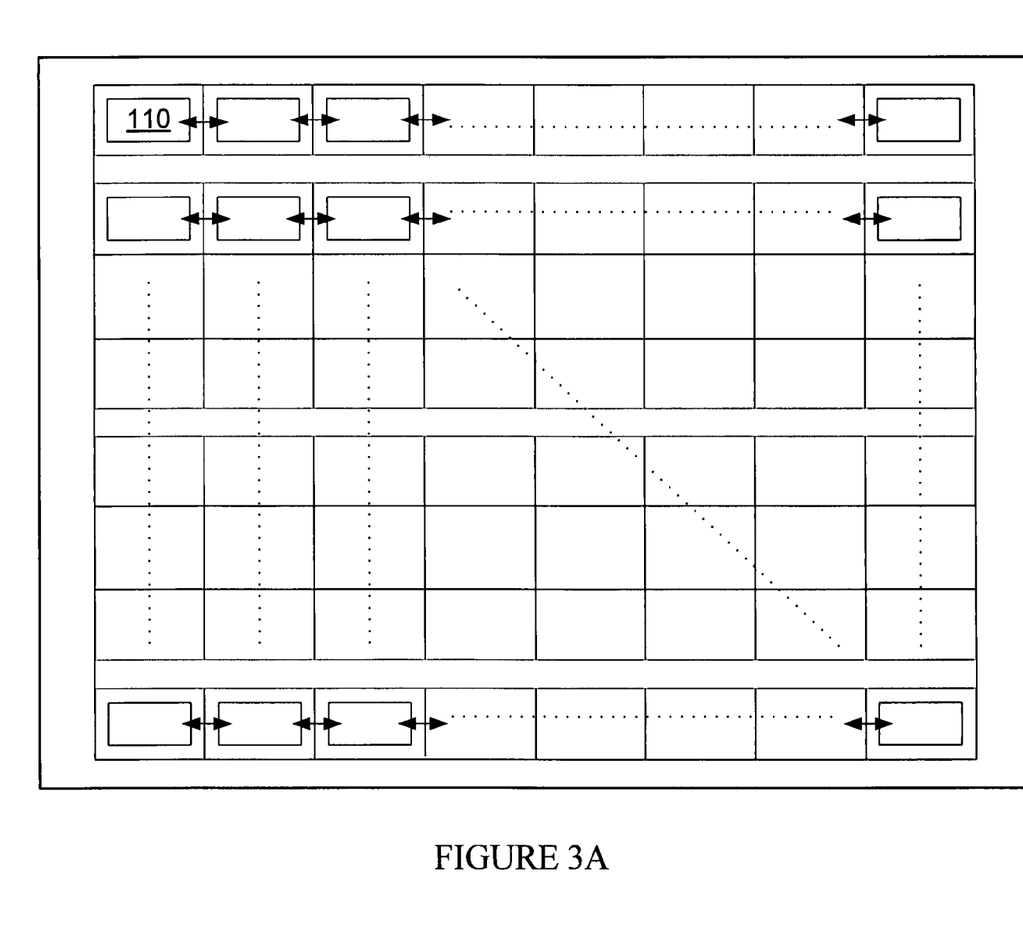
FIGS. 3A-3B illustrate examples of performing dynamic profiling in a many-core processor.
Figure 3B:
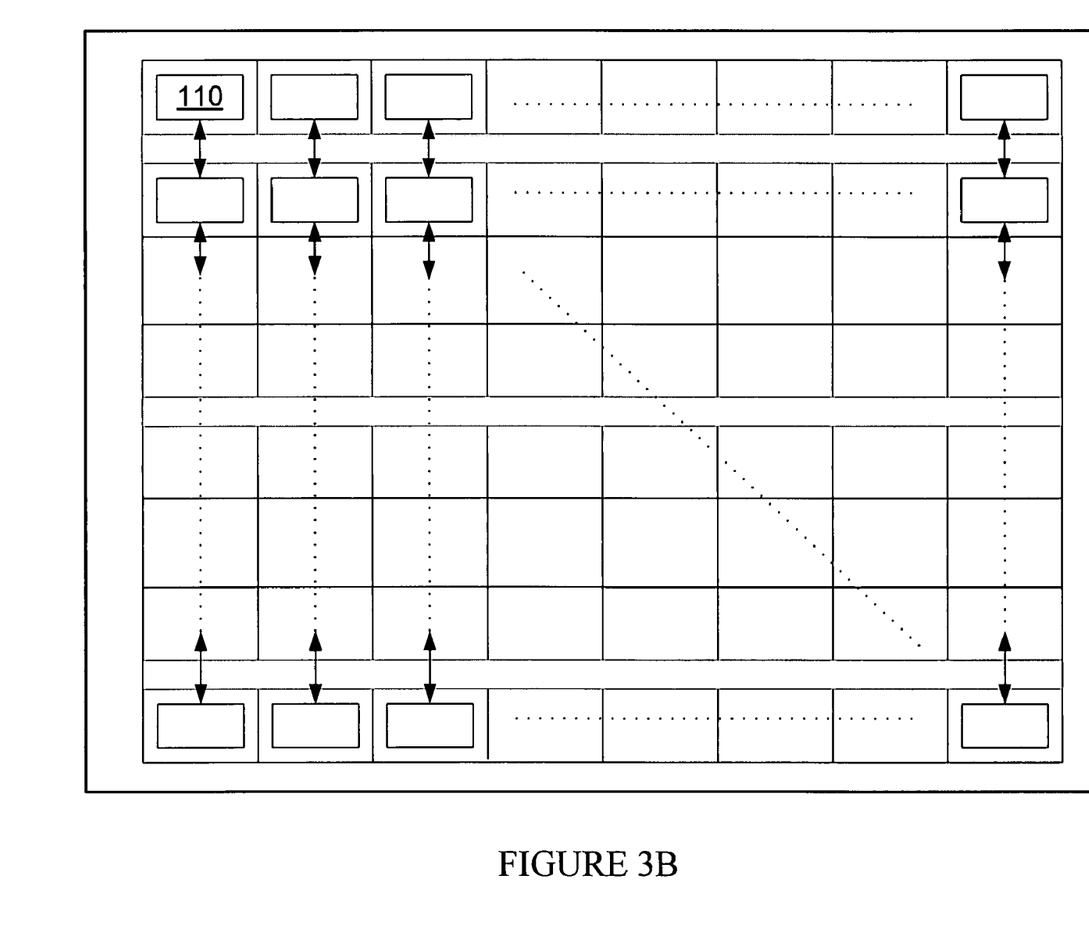

The functional correctness checking module may check the results at a fine grain level (e.g., every one or a few cycles) or at a coarse grain level (e.g., every 100 cycles). The functional correctness checking module may obtain coarse grain information such as the fraction of tests that fail, the number of errors, and so on, as well as fine grain information such as which functional blocks or instructions give errors. The FRC-based functional correctness checking may be performed between two neighboring cores as illustrated by FIGS. 3A and 3B. The pair-wise assignments for functional correctness checking may be changed regularly (e.g., from assignments illustrated in FIG. 3A to assignments illustrated in FIG. 3B) to reduce the chances of a faulty core always checking a core that functions correctly. In another embodiment, a few cores may be selected to perform the FRC-based functional correctness checking for all the other cores in the processor. These selected cores also perform functional correctness checking among themselves (e.g., pair-wise checking among themselves). The functional correctness checking module may determine how to perform checks, for example, whether pair-wise checking is used and when pairs should be changed, or whether a few cores is selected to conduct checks.

The functional correctness checking module may perform checks during normal operation where the results of computation are validated at regular checkpoints. These checks can also be carried out in standby mode for non-critical applications, where the power consumption may be a more important factor rather than functional accuracy. Examples are graphics applications running on portable devices. The functional checks could use the user application programs or pre-characterized test routines that systematically check each functional mode of the core. Errors found during functional correctness checks may be either transient or static. Transient errors may be distinguished from static errors by re-conducting the same check. If the errors disappear after the re-check, these errors are transient; otherwise, they are static. Even though transient errors might not be as harmful as static errors, cores that are more susceptible to transient errors may be flagged for closer monitoring.

Reliability tracking module 250 as shown in FIG. 2 may use embedded routines to obtain the trending information of parameters such as the maximum operating frequency, power consumption and leakage, rates of functional errors, etc. The trending information may not be available after the first test. After the second test, results from the second test may be compared with the results from the first test to obtain changes between these tests. Typically, the trending information will become more reliable over time because more data is available.

Controller 260 may coordinate among different components in dynamic profiling apparatus 200 and control operations of these components. For example, the controller may trigger a test for dynamic profiling. Once a test is triggered, different components (e.g., the power consumption measuring module and the operating speech measuring module) may start to measure their corresponding parameters. In one embodiment, the controller may periodically trigger a test for dynamic profiling by itself. In another embodiment, the OS may request the controller to trigger a test.

Additionally, the controller may control the timing of measurement by each component during each test. For example, the controller may ask the temperature sensors to wait until a test application (e.g., a power hungry application) runs for a certain period of time before measuring temperatures. Also the controller may order a component not to perform anything during a test. For example, during the very first test, the controller may ask the reliability tracking module not to perform anything; and the controller may also request the reliability tracking module to obtain the tending information every several tests instead of every single test. Moreover, the controller may direct a component to use a certain method to obtain the desired information. For example, the controller may direct the functional correctness checking module to use the pair-wise method to conduct checks and to change pairs after a certain number of tests. Furthermore, the controller may coordinate among different components to obtain certain parameters. For example, the controller may coordinate between the power consumption measuring module, the temperature sensors, and the operating speed measuring module to obtain the relationship among the power consumption, the voltage, the power leakage, and the operating speed of a core.

Although not shown in FIG. 2, information obtained during dynamic profiling may be stored in shared memories in a many-core processor. A pre-defined sector of a shared memory may be designated for storing dynamic profiles for all the cores. The dynamic profiles may be accessed by the OS and/or other applications.

In one embodiment, the dynamic profile for a core may be built by a neighboring core as shown in FIGS. 3A-3B. For example, each core may have a power consumption measuring module that can be used to measure power consumption and leakage of its neighboring cores. The pair-wise assignments for building dynamic profiles may be changed regularly (e.g., from assignments illustrated by FIG. 3A to assignments illustrated by FIG. 3B) to reduce the chances of a faulty core building an incorrect profile for a core than is functioning correctly. In another embodiment, certain cores may be dedicated as profile builders. These profile builders build dynamic profiles for other cores for each other among themselves.

Figure 4:
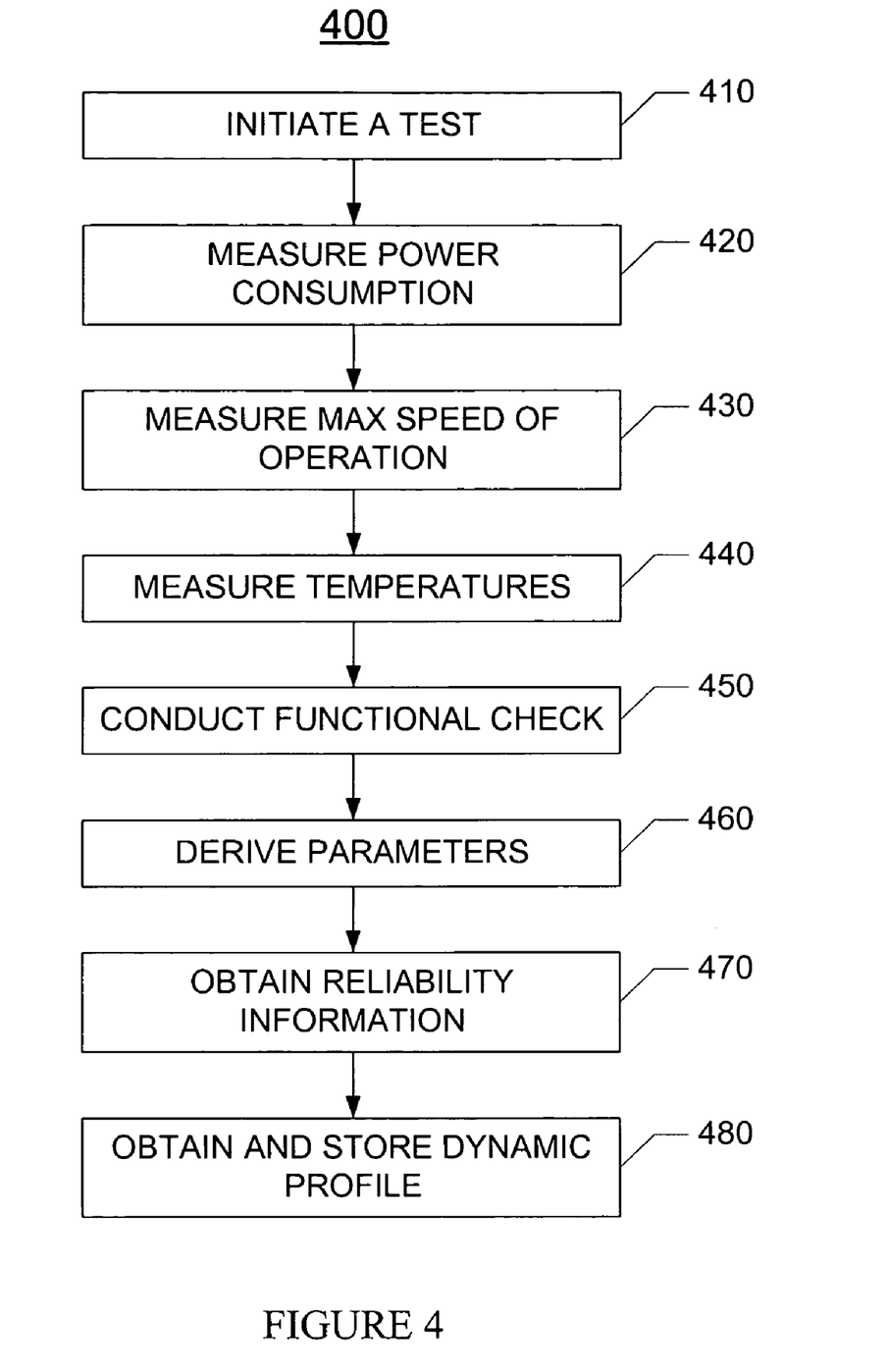
FIG. 4 shows a flowchart of one example process for performing dynamic profiling for each core in a many-core processor.

FIG. 4 shows a flowchart of one example process 400 for performing dynamic profiling for each core in a many-core processor. At block 410, a test may be initiated. A test may be initiated periodically (e.g., every hour) or at any time by the OS. At block 420, power consumption by each core may be measured. At block 430, the maximum operating speed of each core may be measured. A maximum operating speed at each level of voltage may be measured. At block 440, temperatures across the die area of each core may be measured to identify hot spots and temperature variations. At block 450, functional correctness checking may be performed. Although blocks 420 through 450 are separately shown in FIG. 4 for the illustrative purpose, functions involved in these blocks may be performed either sequentially, or in parallel, or in an interleaved fashion. Additionally, there may be other acts performed to obtain more parameters or relationships between the parameters for a dynamic profile of each core.

At block 460, more parameters characterizing a core may be derived from data obtained from functions performed in blocks 420 through 450. Note that functions formed at block 460 may be merged with those functions performed in previous blocks (e.g., block 420 or combination of several blocks). At block 470, trending information may be obtained by comparing parameters obtained during the current test and those obtained from the previous tests. This is performed starting from the second test. Reliability of a core may be indicated by the trending information of parameters that characterize the core. At block 480, a dynamic profile including all the parameters and their trending information for each core may be obtained and stored. Note that this block is shown separately from other blocks for illustrative purposes. In practice, parameters may be stored once they are obtained.

Figure 5:
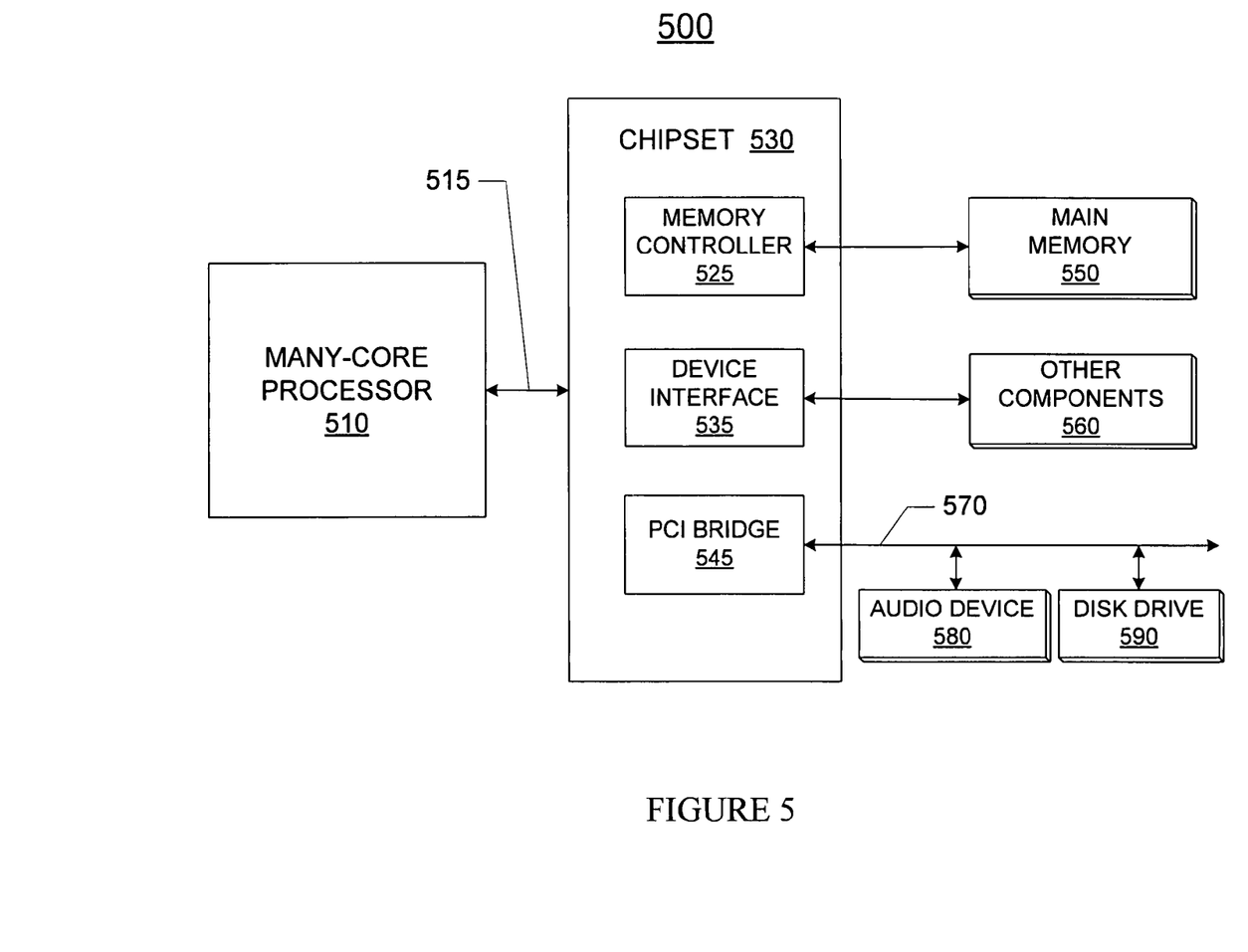
FIG. 5 shows one example computing system where a many-core processor may be used.

FIG. 5 shows one example computing system 500 where a many-core processor may be used. Computing system 500 may comprise one or more processors 510 coupled to a system interconnect 515. Processor 510 may be a many-core processor that has a dynamic profiling apparatus to build a dynamic profile for each core. Dynamic profiles may be built through periodic testing initiated by the dynamic profiling apparatus itself or through tests initiated by the OS. Each dynamic profile may include information on a core's maximum operating frequency, power consumption, power leakage, functional correctness, and other parameters. The dynamic profile may also include the trending information of these parameters.

The computing system 500 may also include a chipset 530 coupled to the system interconnect 515. Chipset 530 may include one or more integrated circuit packages or chips. Chipset 530 may comprise one or more device interfaces 535 to support data transfers to and/or from other components 560 of the computing system 500 such as, for example, BIOS firmware, keyboards, mice, storage devices, network interfaces, etc. Chipset 530 may be coupled to a Peripheral Component Interconnect (PCI) bus 570. Chipset 530 may include a PCI bridge 545 that provides an interface to the PCI bus 570. The PCI Bridge 545 may provide a data path between the processor 510 as well as other components 560, and peripheral devices such as, for example, an audio device 580 and a disk drive 590. Although not shown, other devices may also be coupled to the PCI bus 570.

Additionally, chipset 530 may comprise a memory controller 525 that is coupled to a main memory 550. The main memory 550 may store data and sequences of instructions that are executed by the processor 510 or any other device included in the system. The memory controller 525 may access the main memory 550 in response to memory transactions associated with the processor 510, and other devices in the computing system 500. In one embodiment, memory controller 550 may be located in processor 510 or some other circuitries. The main memory 550 may comprise various memory devices that provide addressable storage locations which the memory controller 525 may read data from and/or write data to. The main memory 550 may comprise one or more different types of memory devices such as Dynamic Random Access Memory (DRAM) devices, Synchronous DRAM (SDRAM) devices, Double Data Rate (DDR) SDRAM devices, or other memory devices.

Figure 6:
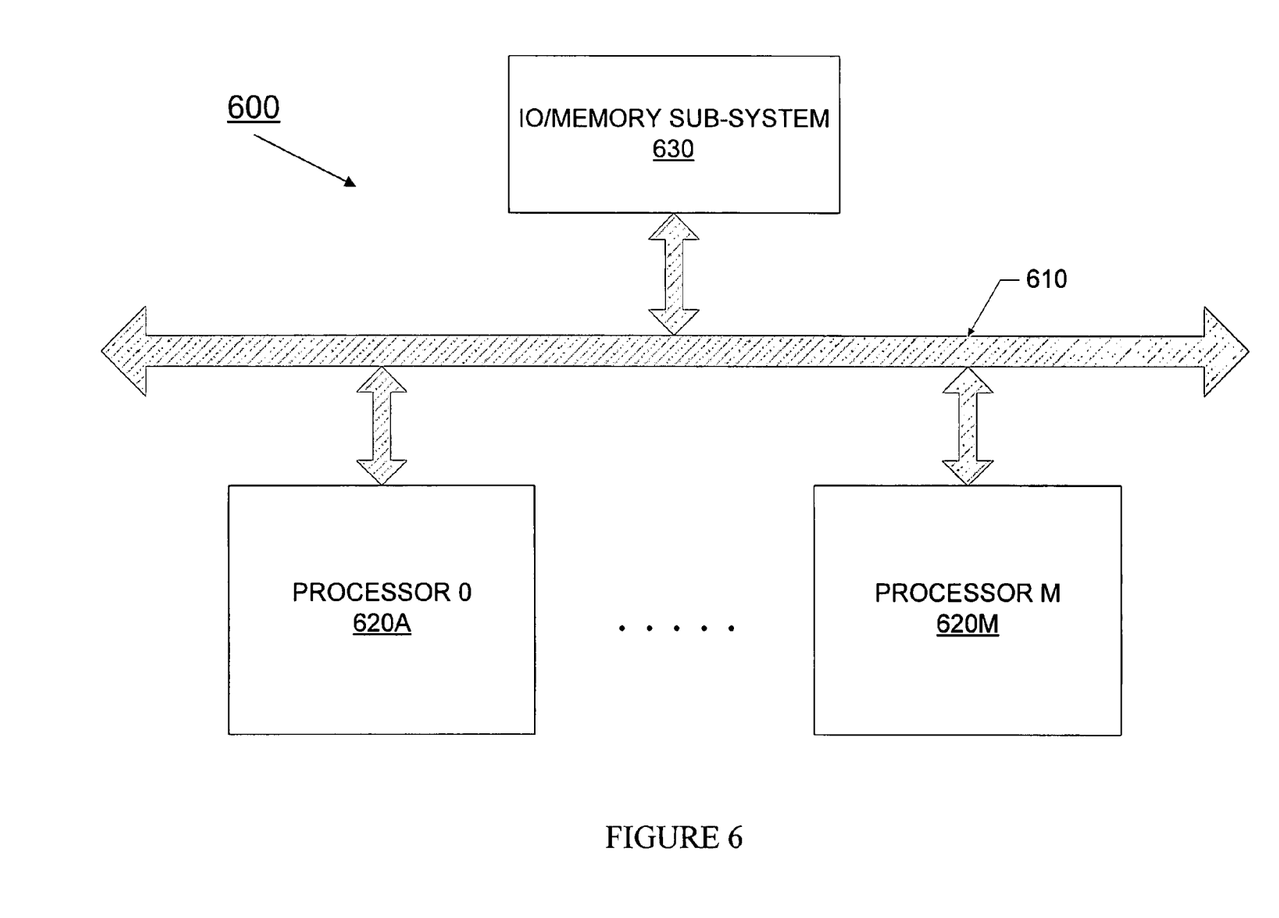
FIG. 6 shows another example computing system where a many-core processor may be used.

FIG. 6 shows another example computing system 600 where a many-core processor may be used. System 600 may comprise multiple processors such as processor0 620A. One or more processors in system 600 may have many cores. The many-core processor(s) may have a dynamic profiling apparatus to build a dynamic profile for each core. Dynamic profiles may be built through periodic testing initiated by the dynamic profiling apparatus itself or through tests initiated by the OS. Each dynamic profile may include information on a core's maximum operating frequency, power consumption, power leakage, functional correctness, and other parameters. The dynamic profile may also include the trending information of these parameters. Processors in system 600 may be connected to each other using a system interconnect 610. System interconnect 610 may be a Front Side Bus (FSB). Each processor may be connected to Input/Output (IO) devices as well as memory 630 through the system interconnect.

Figure 7:
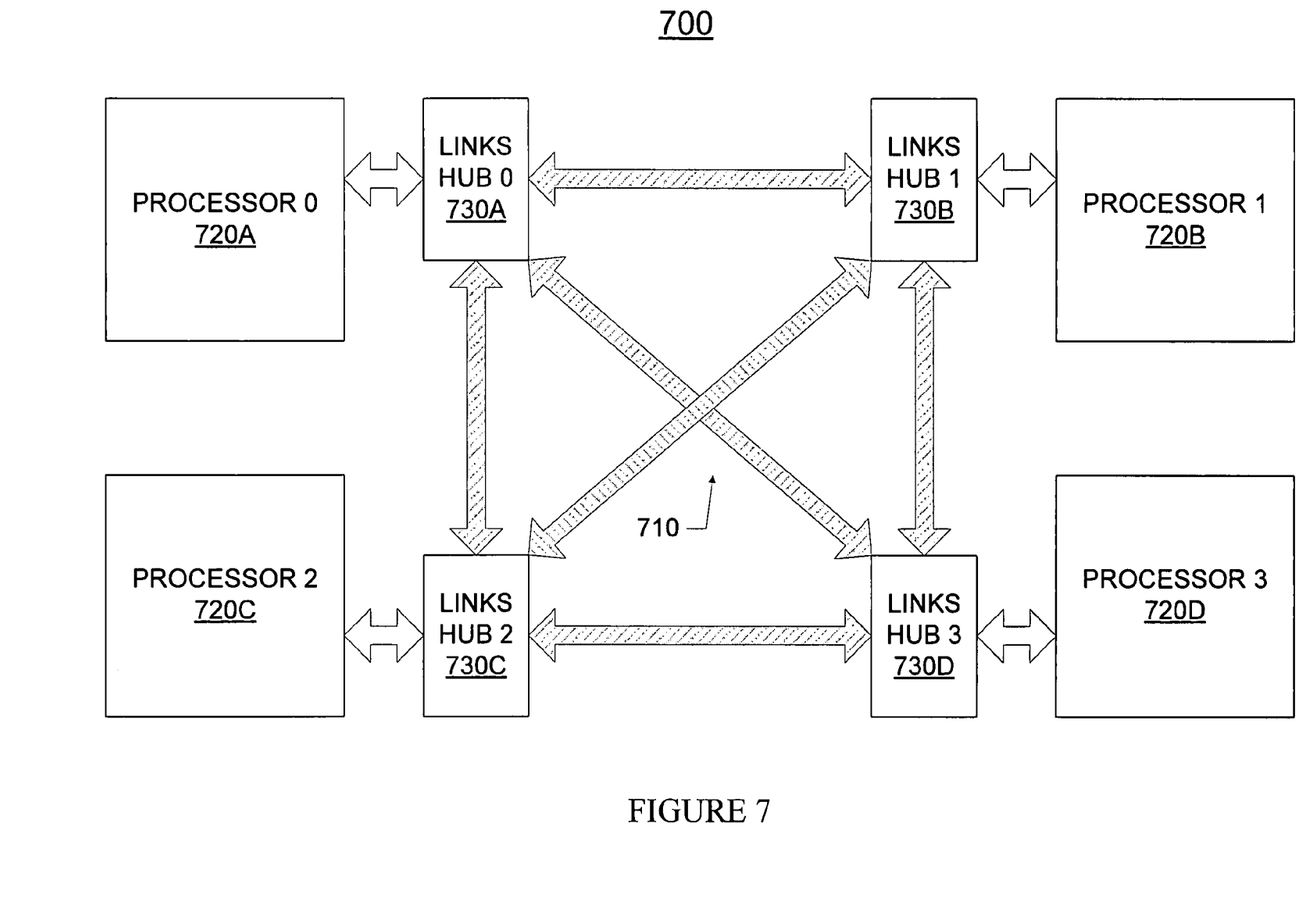
FIG. 7 shows yet another example computing system where a many-core processor may be used.

FIG. 7 shows yet another example computing system 700 where a many-core processor may be used. In system 700, system interconnect 710 that connects multiple processors (e.g., 720A, 720B, 720C, and 720D) is a links-based point-to-point connection. Each processor may connect to the system interconnect through a links hub (e.g., 730A, 730B, 730C, and 730D). In some embodiments, a links hub may be co-located with a memory controller, which coordinates traffic to/from a system memory. One or more processor may have many cores. The many-core processor(s) may have a dynamic profiling apparatus to build a dynamic profile for each core. Dynamic profiles may be built through periodic testing initiated by the dynamic profiling apparatus itself or through tests initiated by the OS. Each dynamic profile may include information on a core's maximum operating frequency, power consumption, power leakage, functional correctness, and other parameters. The dynamic profile may also include the trending information of these parameters.

Figure 8:
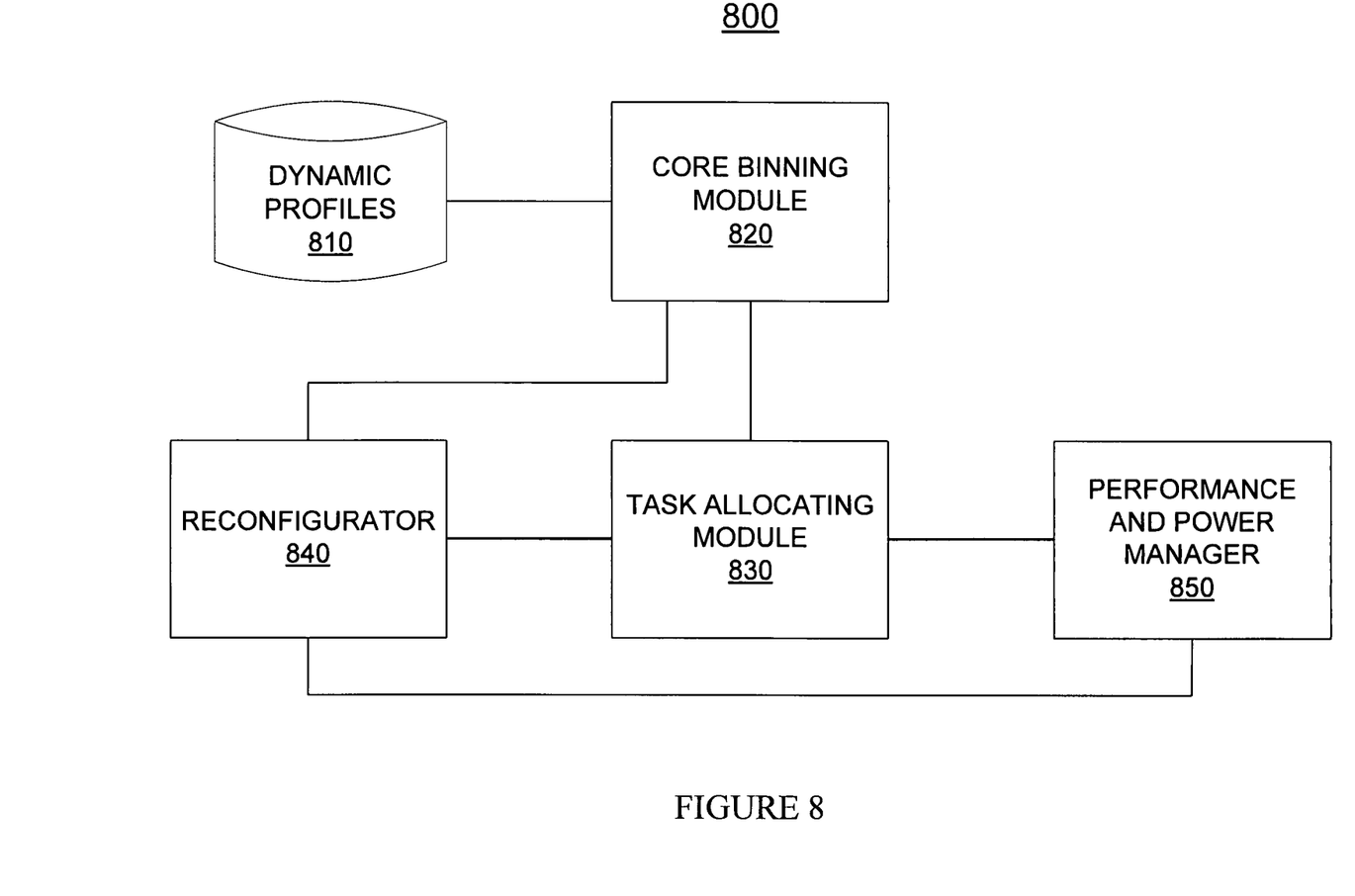
FIG. 8 shows one example block diagram of a system that uses a dynamic profile of each core in a many-core processor to improve the effectiveness of executing a task.

FIG. 8 shows a block diagram of one example system 800 that uses a dynamic profile of each core in a many-core processor to improve the effectiveness of executing a task. System 800 may comprise dynamic profiles 810 for all of the cores in the many-core processor, a core binning module 820, a task controller 830, a reconfigurator 840, and a performance and power manager 850. Dynamic profiles 810 may be built and refreshed by a dynamic profiling apparatus as described in FIG. 2. The dynamic profiles may be stored in a designated section of a memory shared by the cores in the many-core processor. The dynamic profiles are accessible by the OS.

Core binning module 820 may group cores in a many-core processor into one or more bins according to one or more core characterizing parameters in the dynamic profiles. For example, based on the dynamic profiles, some cores may be assigned to be fast cores, some may be slow cores and others may be reserved as spare cores. The number of bins may be tuned so as to obtain better control of the number of cores in a particular bin. A core may be moved from the fast pool to the slow pool over time due to degradation in its performance. When this occurs, a number of options may be pursued to maintain the performance of the processor at its bin level. A spare core may be added to the fast pool, or existing cores may be run at a higher frequency using voltage scaling or body bias adjustment techniques.

In another example, cores may be grouped into bins according to the level of their power consumption or according to other parameters such as reliability parameters. Yet in another example, cores may be grouped into different sets of bins: one set according to the operating speed, one according to the power consumption level, one according to reliability parameters, etc. In one embodiment, cores may be grouped into different sets of bins after dynamic profiles are built. The binning process may be performed by a software/firmware module embedded in the many-core processor. In another embodiment, the binning process may be performed when a task is received by the OS so that cores may be grouped into bins according to the specific requirements of the task. For example, if a task is very computation-intensive, cores may be grouped into bins according to their operating speed; if a task is to be executed on battery, cores may be grouped into bins according to their level of power consumption. Yet in another embodiment, the core binning module may group cores into a few basic bins according to some parameters such as operating speed and power consumption after the dynamic profiles are built for all of the cores; and group cores into other sets of bins according to specific requirements of the task under the direction of the OS when a task is received. Bins formed for a specific task (or tasks) may be dismantled or kept after the task(s) has/been completed.

Because a core's characteristics may change from one test to another, cores across different bins may need to be reshuffled after each test; and/or a core, which originally fell into one bin but does not meet the standard of that bin after a new test, may be re-conditioned so that it can still stay in that bin. For example, increasing a core's voltage may increase its operating speed, and reducing a core's voltage and/or speed may reduce the core's power consumption.

Task allocator 830 as shown in FIG. 8 may allocate and/or dynamically re-allocate tasks to cores based on the current dynamic profiles of cores. In one embodiment, requirements of each task may be pre-determined based on task categories. For example, if a task is processing a large amount of data in real time, the task may require fast cores; and if a task is to be executed while the processor is operating on battery power, the task may require cores with a low level of power consumption. In another embodiment, the OS may analyze the task to determine its requirements. Based on the requirements of each task, the task allocator may assign the task to core(s) with corresponding characteristics or a combination of different cores so that the task's requirements can be met. If core profiles change during execution of a task, the task allocator may change the allocation dynamically to maintain the performance level devoted to that task.

Reconfigurator 840 may reconfigure interconnections among different cores. The interconnect fabric in a many-core processor (such as the one shown in FIG. 1) may be reconfigurable so as to derive good benefit from each bin of cores. Since the membership of a core in a particular bin may change over time, the bandwidth and latency between cores is subject to wide fluctuation with a static fabric. Thus, it is desirable to have a flexible and dynamically reconfigurable fabric. At each checkpoint where the mix of cores in the bins is changed, the available bandwidth and latency across cores in a bin may be evaluated and the fabric may be reconfigured if necessary to maintain high level of connectivity. While the physical location of the cores on the die may not change, the switches that make up the fabric may be reconfigured so that cores in the same bin are in logical proximity of each other. The availability of multiple cores, the pool of spare cores and a high connectivity fabric enables quick recovery from faults with minimal degradation of performance. As soon as a test identifies a problem with a particular core, that core may be decommissioned and moved out of active service. A core from the spare pool may take its place. Accordingly, the interconnect fabric may also be reconfigured to mitigate the effect of the faulty core being dropped from service. This significantly improves the ability of the processor to tolerate faults due to variation and degradation.

Performance and power manager 850 as shown in FIG. 8 may re-allocate a task to a different combination of cores or rebalance the same set of cores in response to a changing environment. Moving a system from electrical power to battery power is one example where a re-allocation of tasks to cores that are less leaky and consume less power may be necessary. An increase in system load due to a high number of power hungry applications may also necessitate rebalancing of the workload among the cores. Thus, system and environment factors need to be considered in the dynamic management of the cores, in addition to the core profiles themselves. Techniques that balance voltage, frequency, body bias for a uni-core processor with performance requirements may be applied to a many-core environment with the additional optimization variable of number of available cores. For example, a speed stepping technique may be used to rebalance cores allocated to a task in response to a changing situation, in which case a core's speed may be reduced or increased by reducing or increasing its voltage supply, respectively; and a core's power consumption may be reduced by lower its operating speed and/or its voltage supply.

Figure 9:
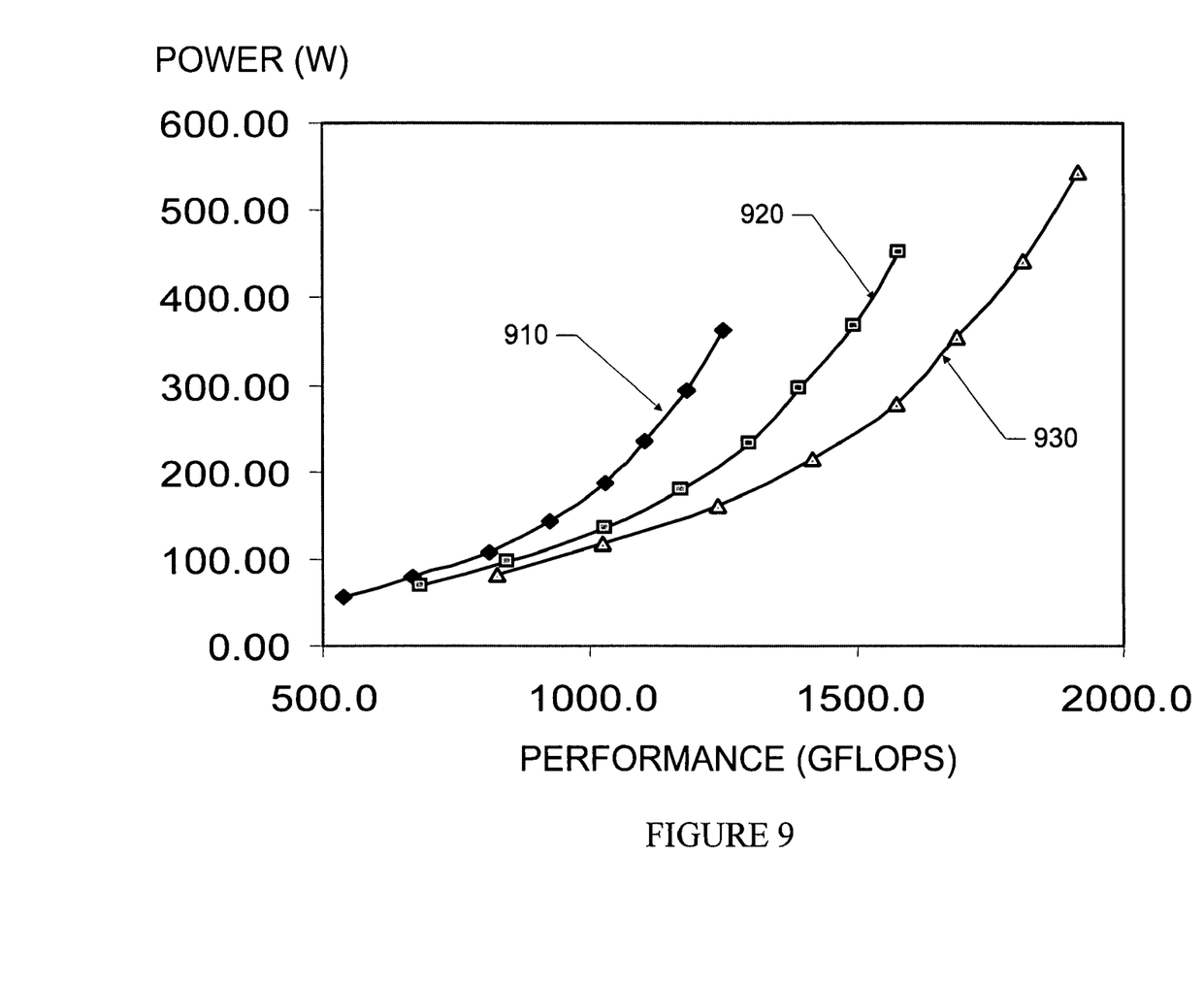
FIG. 9 illustrates one example for managing performance and power consumption for a many-core processor.

FIG. 9 illustrates one example for managing performance and power consumption for a many-core processor. The x-axis of the figure indicates the performance in GFLOPs; and the y-axis indicates the power consumed by a group of cores. Curves in the figure represent the relationship between the performance and power consumption for different number of cores. Curve 910 represents a case where the number of cores is 64 (e.g., 8×8); curve 920 represents a case where the number of cores is 80 (e.g., 8×10); and curve 930 represents a case where the number of cores is 96 (e.g., 8×12). It can be shown that when more cores are used, the performance is better and less power is consumed. This is because when more cores are used, each core may run at a low voltage in parallel to achieve the same or even better performance (compared to a situation where a less number of cores are used and each core runs at a high voltage) and thus the aggregate power consumption may be reduced. Therefore, when a changing environment requires that the power consumption be lowered, the performance and power manager may decide to use more cores and reduce the voltage supply for each core.

Figure 10:
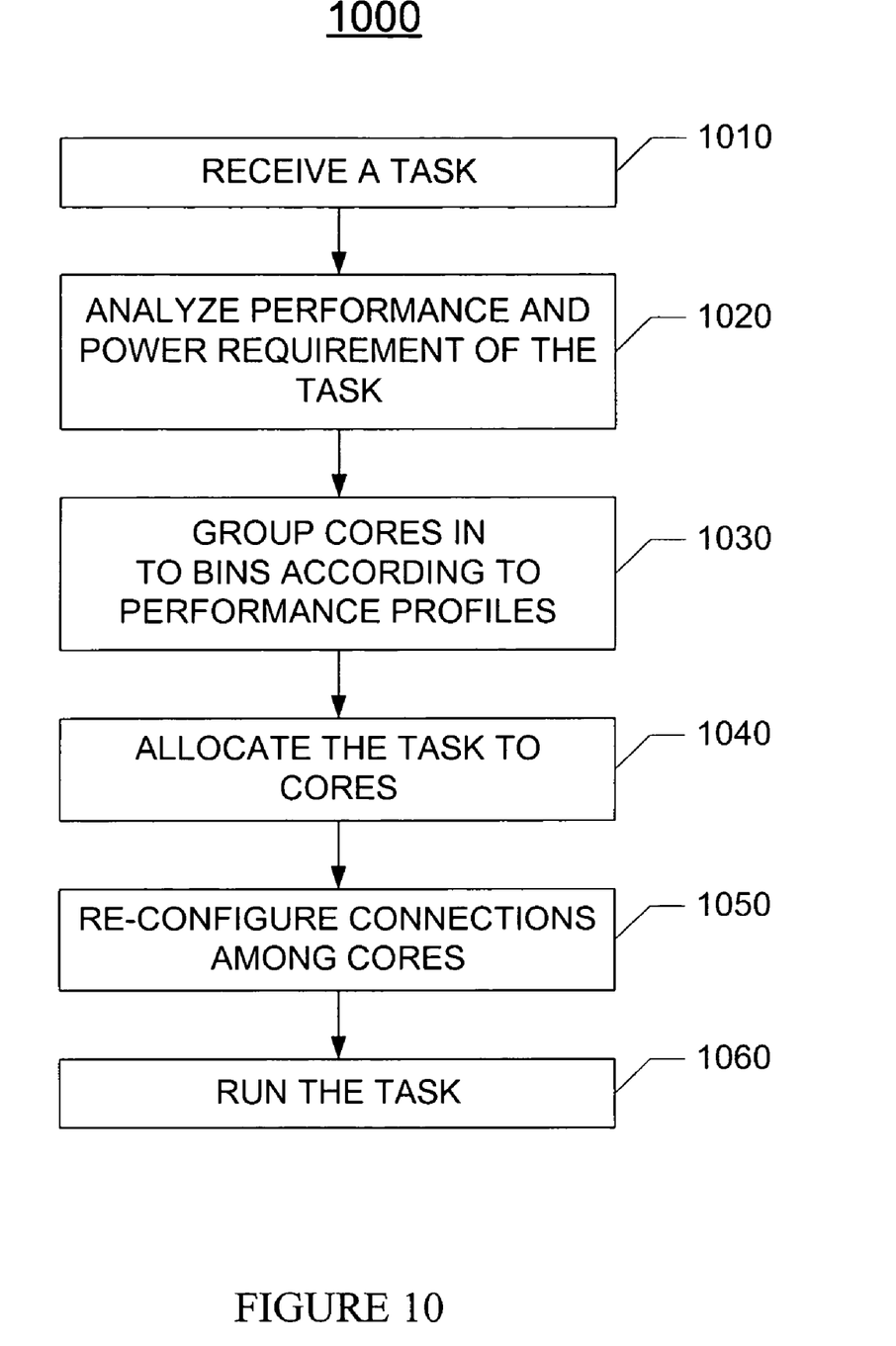
FIG. 10 shows a flowchart of one example process for using a dynamic profile of each core in a many-core processor to improve the effectiveness of executing a task.

FIG. 10 shows a flowchart of one example process 1000 for using a dynamic profile of each core in a many-core processor to improve the effectiveness of executing a task. Process 1000 may be executed after dynamic profiles of cores in the many-core processor have been built. At block 1010, a task may be received by the OS. At block 1020, the OS may analyze the task to determine its requirements (e.g., performance and power requirements). One example approach to determining a task's requirements is to look at data to be processed by the task. For example, if there is a large amount of data is to be processed in real time, the task probably needs fast cores. In some situations, the OS might not need to analyze the task to determine its requirements because these requirements are pre-characterized based on some predetermined task categories (e.g., mobile application to be powered by batteries may be pre-characterized as one that requires low power consumption). At block 1030, cores in the many-core processor may be grouped into different bins based on the cores' dynamic profiles as well as the task's requirements. In one embodiment, the binning process at this block may be partly or entirely performed before a task is even received.

At block 1040, the task may be allocated to cores whose characteristics may enable them to satisfy the requirements of the task. At block 1050, the interconnect fabric in the many-core processor may be reconfigured so that the cores performing the same task may be so connected to increase the available bandwidth and to reduce the latency across them. At block 1060, the task may be executed. During the process of executing the task, a changing environment may trigger re-allocation of a different set of cores to the task and/or rebalancing of the same set of cores.

Although an example embodiment of the disclosed subject matter is described with reference to block and flow diagrams in FIGS. 1-10, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A many-core processor, comprising:
   multiple cores;
   interconnect fabric;
   at least one memory module, said multiple cores and said at least one memory module coupled to said interconnect fabric; and
   a profiling module to dynamically profile characteristics of each core in said many-core processor, characteristics of a core including power consumption by the core and a maximum operating speed corresponding to voltage level of the core.

2. The many-core processor of claim 1, wherein said profiling module comprises:
   a power consumption measuring module to periodically measure power consumption by each core in said many-core processor under different voltages and different speeds;
   an operating speed measuring module to periodically measure the maximum operating speed of each core in said many-core processor under different voltages; and
   a reliability tracking module to obtain reliability information of each core in said many-core processor based at least in part on said measured power consumption data and maximum speeds of each core in said many-core processor.

3. The many-core processor of claim 2, further comprising at least one temperature sensor to measure temperature distribution and to identify hot spots across the die area of each core and said interconnect fabric in said many-core processor.

4. The many-core processor of claim 3, wherein said reliability tracking module obtains trending information of said temperature distribution and said hot spots over time.

5. The many-core processor of claim 2, further comprising a functional correctness checking module to check functional correctness of each core in said many-core processor.

6. The many-core processor of claim 5, wherein said functional correctness checking module performs functional correctness checks in at least a coarse grain level.

7. The many-core processor of claim 5, wherein said reliability tracking module obtains trending information of functional correctness of each core in said many-core processor over time.

8. The many-core processor of claim 2, further comprising a controller to control and coordinate at least said power consumption measuring module, said operating speed measuring module, and said reliability tracking module in a process of dynamically profiling the characteristics of each core in said many-core processor.

9. A method for dynamically profiling characteristics of each core in a many-core processor, comprising:
   periodically initiating a test for each core in said many-core processor;
   measuring power consumption data of each core in said many-core processor during each test under different voltages and different operating speeds;
   measuring a maximum operating speed of each core in said many-core processor during each test under different voltages; and
   obtaining reliability information of each core in said many-core processor based at least in part on said power consumption data and said maximum operating speed obtained during each test.

10. The method of claim 9, further comprising:
    measuring temperatures to obtain hot spots and temperature variation across the die area of each core and said interconnect fabric in said many-core processor; and
    conducting functional correctness checks to obtain functional correctness information of each core in said many-core processor.

11. The method of claim 10, wherein said reliability information comprises trending information of said hot spots and temperature variation across the die area and said functional correctness information of each core in said many-core processor over time.

12. The method of claim 10, further comprising obtaining and storing a performance profile for each core in said many-core processor, said performance profile including at least one of said power consumption data, said maximum operating speed, said functional correctness information, said hot spots and temperature variation across the die area of each core, and trending information thereof for each core in said many-core processor.

13. A computing system, comprising:
    a many-core processor, said many-core processor including a profiling module to create a dynamic profile for each core in said many-core processor, a dynamic profile of a core including power consumption by the core and a maximum operating speed corresponding to voltage level of the core; and
    a task allocating module to receive a task and to allocate said task to a first set of cores based at least in part on requirements of said task and said dynamic profile of each core in said many-core processor.

14. The system of claim 13, wherein said many-core processor further comprises a core binning module to use at least one characteristic of cores as a criterion to group cores in said many-core processor into multiple bins based on said dynamic profile of each core, said multiple bins being used by said task allocating module for assigning said task to said first set of cores.

15. The system of claim 13, further comprising a performance and power manager to at least one of re-assigning said task to a second set of cores and re-balance said first set of cores in response to a changing condition, said second set of cores including at least one different core from said first set of cores.

16. The system of claim 15, further comprising a reconfigurator to reconfigure interconnects among at least one of said first set of cores and said second set of cores.

17. The system of claim 15, wherein said changing condition includes at least one of a changing condition of at least one core in said first set of cores and a changing environment.

18. A method for efficiently executing a task using a many-core processor, comprising:
   receiving a task;
   analyzing said task to determine requirements of said task;
   assigning said task to a first set of cores in said many-core processor based on said requirements of said task and dynamic profiles of said first set of cores, a dynamic profile of a core including power consumption by the core and a maximum operating speed corresponding to voltage level of the core; and
   executing said task using said first set of cores.

19. The method of claim 18, further comprising grouping cores in said many-core processor into multiple bins based on a dynamic profile of each core, according to at least one characteristic of cores in said many-core processor.

20. The method of claim 18, further comprising at least one of re-assigning said task to a second set of cores and re-balancing said first set of cores in response to a changing condition, said second set of cores including at least one different core from said first set of cores.

21. The method of claim 20, wherein said changing condition includes at least one of a changing condition of at least one core in said first set of cores and a changing environment.

22. The method of claim 20, further comprising reconfiguring interconnects among at least one of said first set of cores and said second set of cores.

* * * * *